United States Patent

Standen et al.

[11] Patent Number: 5,856,887
[45] Date of Patent: Jan. 5, 1999

[54] ARTICULATED MOUNTING FOR TRAILER ANGLE SENSOR

[76] Inventors: Christopher Allan Standen, 103 Saunton Road, Hornchurch, Essex RM13 4HQ; John Paul Standen, 39 Fraser Close, Daventry, Northants NN11 5HD, both of England

[21] Appl. No.: 750,767
[22] PCT Filed: Jun. 16, 1995
[86] PCT No.: PCT/GB95/01413
 § 371 Date: Dec. 13, 1996
 § 102(e) Date: Dec. 13, 1996
[87] PCT Pub. No.: WO95/35224
 PCT Pub. Date: Dec. 28, 1995

[30] Foreign Application Priority Data

Jun. 17, 1994 [GB] United Kingdom ............ 9412223

[51] Int. Cl.⁶ .................................................. B60R 1/08
[52] U.S. Cl. .................... 359/843; 359/877; 359/844; 280/432
[58] Field of Search .................... 307/9.1, 10.1; 248/548, 549, 900; 359/843, 877, 844; 73/1.75; 280/432, 423.1

[56] References Cited

U.S. PATENT DOCUMENTS 5,249,083  9/1993  Doughtie et al. ................ 359/865
5,541,778  7/1996  DeFlorio ........................... 359/843

FOREIGN PATENT DOCUMENTS

A 59-11938  1/1984  Japan ................................ 359/843

Primary Examiner—Thong Nguyen
Assistant Examiner—John Juba, Jr.
Attorney, Agent, or Firm—Caesar, Rivise Bernstein, Cohen & Pokotilow, Ltd.

[57] ABSTRACT

The tractor unit of an articulated road vehicle includes an angle sensor unit arranged to sense the angular position of the trailer relative to the tractor and to cause the rear view mirror for the driver to move so that he can always see the trail end of the trailer. According to this invention the sensor unit is deflectable mounted on the tractor unit so that it can be moved out of harms way when hit, e.g., by a trailer.

9 Claims, 4 Drawing Sheets

ARTICULATED MOUNTING FOR TRAILER ANGLE SENSOR

The invention relates to apparatus for positioning a rear view mirror, especially for an articulated road vehicle.

BACKGROUND OF THE INVENTION

An articulated road vehicle comprises a tractor unit to which can be coupled a trailer. The tractor unit is generally fitted with a rear view mirror on each side of the driver's cab. When driving in a straight path, these mirrors provide adequate visibility to the rear corners of the trailer. However, when the tractor unit is rotated relative to the trailer, either when reversing or whilst negotiating a tight turn in the forward direction, the rear corners of the trailer are outside the field of view of the mirrors. In order to combat this problem, an angle sensing apparatus may be arranged on the tractor to vary the position of the rear view mirrors according to the angle between the tractor and the trailer so that the driver can always see, using the mirror, along the length of the trailer. Such apparatus is disclosed in EP-A-094817, U.S. Pat. No. 3,950,080, U.S. Pat. No. 4,609,265, U.S. Pat. No. 4,679,158; WO88/04619.

One type of angle sensing device is described and claimed in our GB patent 2259064B and includes a lever connected to a potentiometer mounted on the tractor, the potentiometer acting as a sensor, adjacent to the coupling of the tractor and trailer, and an elastic member extending from the lever which can be detachably connected to a mounting point on the trailer. Information about the angle of rotation of the trailer relative to the tractor is provided to a control unit in the cab of the tractor unit which in turn actuates drive means to rotate the mirror accordingly about a generally vertical axis. In many cases it is preferable to mount the sensor to the rear of the coupling point and detachably mount the elastic member on a convenient point under the trailer. It has been discovered that in different sensor mounting positions there is a risk of damage to the sensor as the trailer is coupled or decoupled. It is accordingly one object of the invention to provide means for mounting an angle sensor on the tractor unit of an articulated road vehicle which reduces the risk of damage to the sensor at least during the coupling and decoupling of the trailer unit.

BRIEF STATEMENT OF THE INVENTION

Accordingly, in one aspect the invention provides a tractor unit having at least one rear view mirror, the mirror being adjustable according to information from an angle sensor mounted on the tractor unit characterised in that the angle sensor is deflectably mounted on the tractor unit.

The angle sensor is preferably mounted in such a way that it will automatically be deflected under an abnormal load from any direction, e.g. when hit by the trailer during coupling or decoupling. The mounting may take a variety of forms. In one particularly preferred embodiment, the mounting means comprises a lower portion mounted on the tractor unit near the fifth wheel coupling, and an upper portion to which the sensor is attached, the upper portion being pivotally connected to the lower portion and being urged to the vertical condition by a releasable catch means. In use, if an abnormal force is applied to the upper portion (to which the angle sensor is attached) the upper portion is deflected once the catch is released.

In another embodiment there is provided manually operable mounting means, e.g. a plate on which the sensor is mounted, which is lockable in an in-use position or in an out-of-the-way deflected position. For this embodiment the operator needs to move the mounting means, and warning means may be needed to remind him of the position of the mounting means at any given movement.

Auxiliary means may be present to cause the mounting means to maintain its last position or to revert to its in-use or out-of-the-way position. The means may be manual, electrical or pneumatic. The means may allow deflection in one or many planes.

The angle sensor may be of any known type.

The mounting means may be mounted on the tractor vehicle chassis or the fifth wheel subchassis or any other suitable place.

BRIEF DESCRIPTION OF THE DRAWINGS

In order that the invention may be well understood it will now be described in detail by example only with reference to the accompanying diagrammatic drawings in which.

The same reference numerals are used to describe the same or similar parts of the different embodiments with the addition of a suffix A.

DETAILED DESCRIPTION OF THE INVENTION

Figure 1:
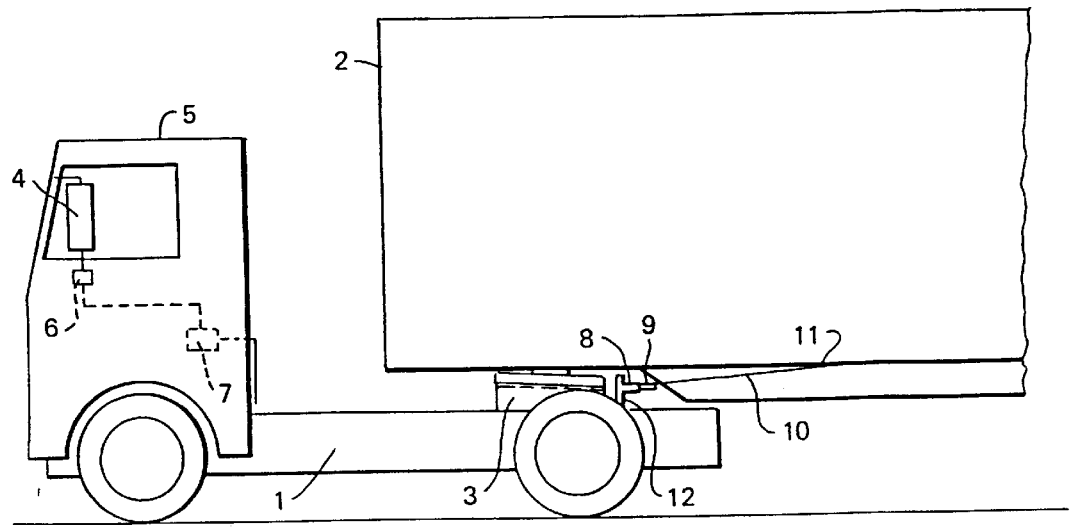
FIG. 1 is a side elevation of an articulated road vehicle equipped with apparatus of the invention.

Referring to FIG. 1, an articulated road vehicle comprising a tractor 1 coupled to a trailer 2 through a fifth wheel coupling 3 has rear view mirrors 4 mounted each side of the cab 5 of the tractor 1. Each mirror is provided with a motor drive unit 6 linked to a control box or unit 7 in the cab. An angle sensing device is mounted on the tractor 1 to the rear of the fifth wheel coupling 3 and consists of a unit 8 containing a rotary potentiometer (not shown) connected to a lever 9 which is arranged to rotate to a limited angle to the left and right.

One end of an elastic cord 10 is attached to the free end of the lever 9, and is provided at its other end with means to detachably mount at a point 11 on the trailer 2, for example, a point on the trailer chassis. As the tractor 1 rotates relative to the trailer 2, the cord 10 rotates the lever 9 accordingly, the elasticity of the cord 9 accommodating the change in distance between the mounting point 11 and the unit 8. The angle of rotation of the lever 9 and hence the potentiometer in the unit 8 is transmitted to the control box 7 to actuate the drive means 6 to position the rear view mirrors 4 to give a clear view of the rear of the trailer 2.

Figure 2:
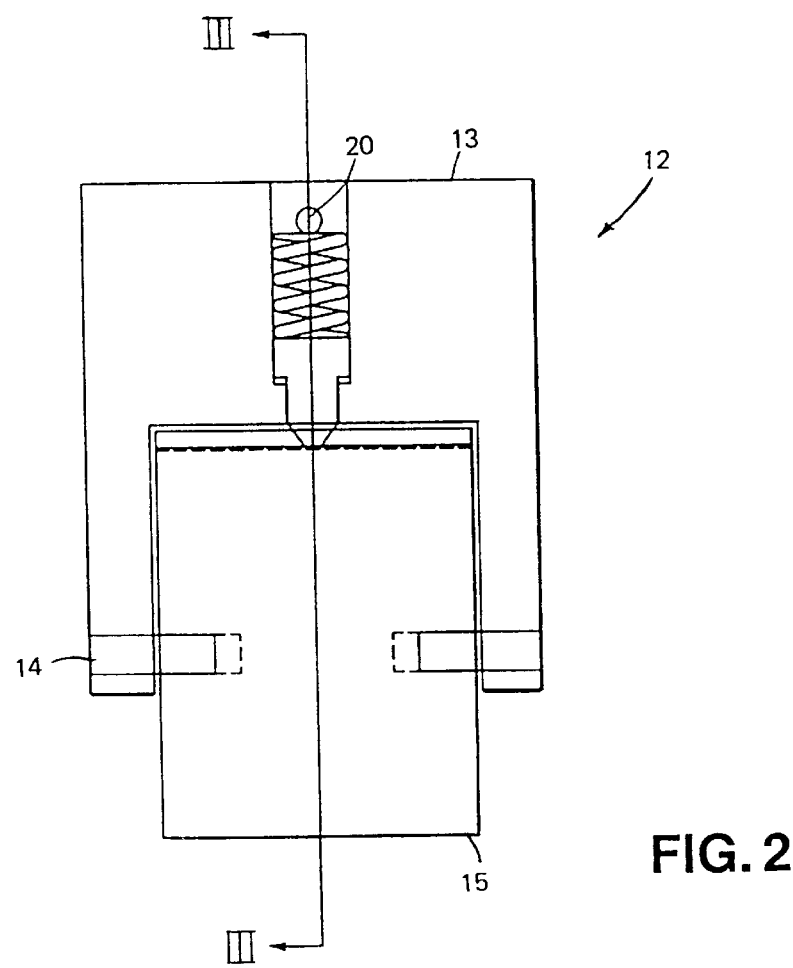
FIG. 2 is a front elevation of a mounting bracket of the invention drawn to a much enlarged scale relative to FIG. 1.
Figure 3:
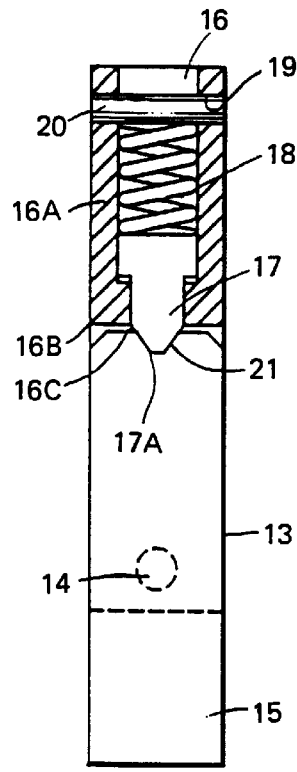
FIG. 3 is a sectional view of the mounting bracket of the invention taken along the lines A—A on FIG. 2.
Figure 4:
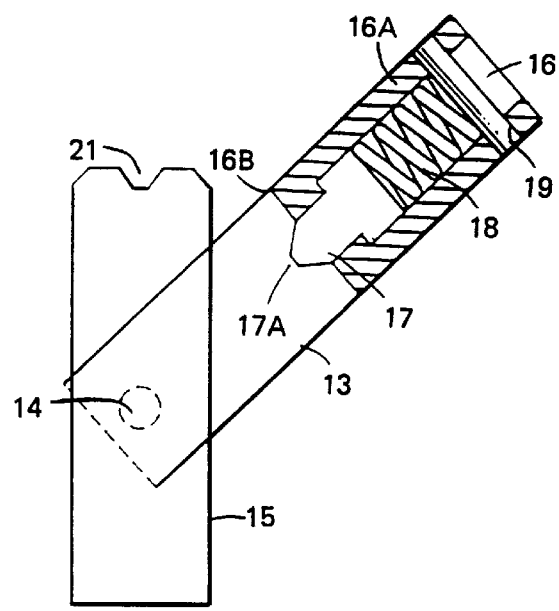
FIG. 4 is a side elevation partly in section of the bracket of FIG. 3, in its deflected position.

The angle sensor unit 8 is mounted on one face of a bracket 12 which is shown in the normal position in FIGS. 2 and 3 and the deflected position in FIG. 4.

The bracket 12 comprises an upper block 13 mounted on a transverse pivot 14 extending through a lower block 15. The block 15 is attached to the tractor unit to the rear of the fifth wheel coupling 3 in any convenient way.

A bore 16 extends inwardly from the top of the block 13 and has an upper wider diameter portion 16A and a lower narrower diameter portion 16B having an outlet 16C. A T-shaped plunger 17 is received in the bore 16. A pin 20 is received in a crossbore 19 to compress a spring 18 which urges the plunger 17 downwards until its nose 17A projects out of the outlet 16C.

A shallow recess 21 (FIG. 4) is present in the upper face of the lower block 15 and is arranged to receive nose 17A of the plunger 17 when the block 13 is in a true vertical position. When the upper block 13 is held in a true vertical position by the reception of the nose 17A in the recess 21, and the angle sensor is in use the force exerted by the elastic member of the angle sensor will not overcome the spring force of the spring 18, and the blocks will remain in vertical alignment. However, if sufficient force is accidentally exerted on the block 13, for instance if the block 13 is struck by the trailer during coupling or decoupling, the pin 17 will be displaced from the recess 21 and the upper block 13 will be deflected to the condition shown in FIG. 4. As a result the associated angle sensor will be deflected out of harms way.

When the trailer is coupled to the tractor unit, the electrical and pneumatic services (not shown) of the vehicle must also be connected before the vehicle moves off. The action of connecting or disconnecting the services may be arranged to position an angle sensor mounting. The position of the angle sensor may be detected and a warning signal activated if the sensor is in the incorrect position.

Figure 5:
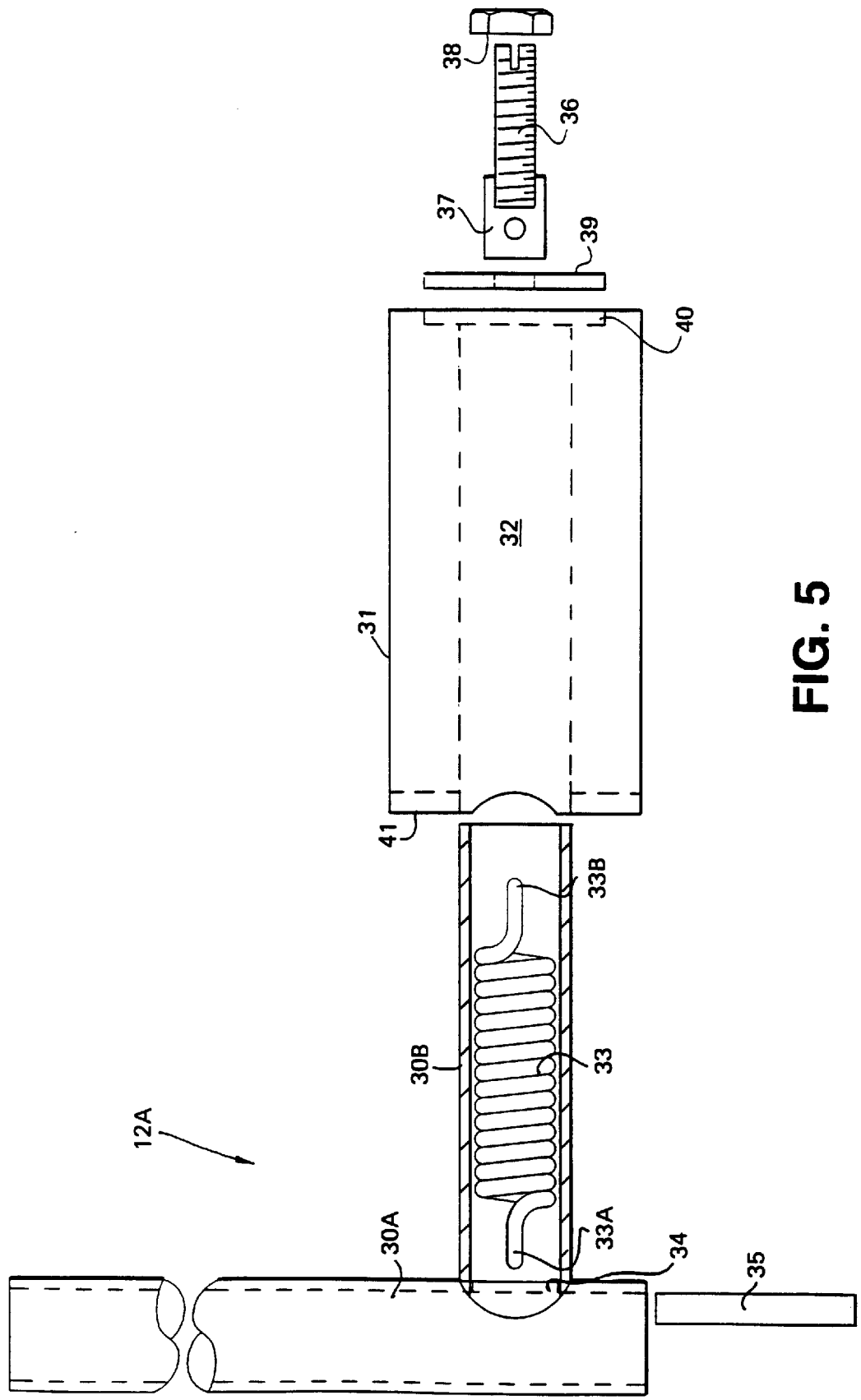
FIG. 5 is an exploded elevation of another embodiment of the invention.
Figure 6:
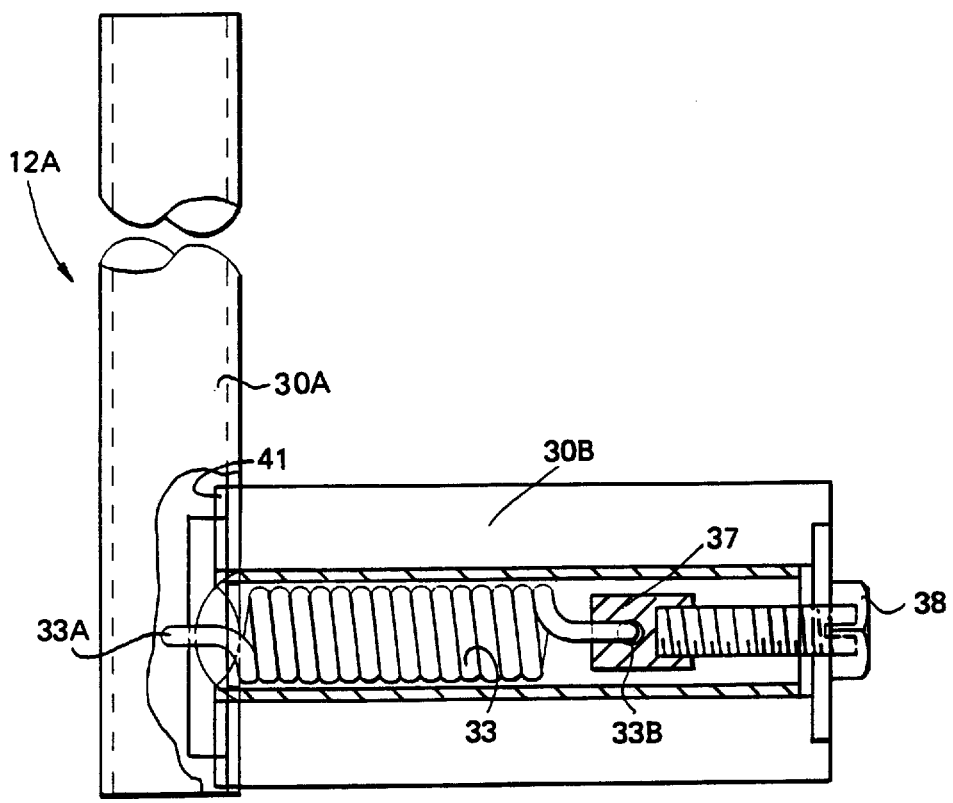
FIG. 6 is an elevation of the assembled mounting means of FIG. 5.

In the embodiment of FIGS. 5 and 6, a bracket 30 is constructed by securing together, e.g. by welding, two lengths of round section tube 30A,30B. Bracket 30 is received in and supported by the longitudinal bore 32 of cylinder 31. Spring 33 is located within component 30B of bracket 30. One end 33A of spring 33 protrudes through hole 34 of component 30A. Pin 35 is passed through the eye of spring 33 and prevents the withdrawal of spring 33. Once fitted, pin 35 is secured in position by welding or other suitable means. Drawbolt 36 is attached by welding or other suitable means to plate 37. Plate 37 is attached to end 33B of spring 33. Nut 38 is wound onto drawbolt 36 and bears against washer 39 which is located within recess 40 of cylinder 31. Tightening of nut 38 causes spring 33 to be tensioned, thus pulling component 30A of bracket 30 against the face 41 of cylinder 31. The face 41 has four segments, defining two cross channels at right angles to each other, to receive the round section 30A. Angle sensor 8 is attached to 30A. Tension of elastic cord 10 results in a torsional force which attempts to rotate component 33B within the bore 32 of cylinder 31, this rotation is prevented during normal operation by the engagement of 30A within the contours of face 41. In the event of abnormally high forces being applied to sensor 8, the effect of 30A acting on the contours of face 41 will result in bracket 30 moving against the tension of spring 33, thus allowing bracket 33 and sensor 8 to move from the vertical position to the horizontal position.

Cylinder 31 is fixed to part of the tractor by means of a suitable clamp, not shown.

We claim:

1. An articulated road vehicle comprising a tractor and a trailer, the tractor having at least one positionable rear view mirror, an angle sensor being mounted on the vehicle, the mirror being movable in response to a signal from the angle sensor, the angle sensor being pivotable about a horizontal axis, wherein the angle sensor is deflectably mounted so as to be deflectable to an out-of-the-way deflected position on being hit by the trailer.

2. A vehicle as claimed in claim 1, wherein the angle sensor is mounted on a support member which is biased to an upright position.

3. A vehicle according to claim 2, wherein the support member is provided with releasable latch means which defines said upright position.

4. A vehicle according to claim 3, wherein said latching means comprises a projection and a recess which are urged into mutual engagement in said upright position by a biasing spring and are disengaged when the angle sensor is deflected from the upright position.

5. A vehicle according to claim 3, wherein said latching means comprises a first elongate member which is pivotable about the axis of a second member and is urged by a biasing spring into a transverse channel at the end of the second member, the first member being disengagable from said channel when the angle sensor is deflected from the upright position.

6. An articulated road vehicle according to claim 5, wherein said first member is tubular and said biasing spring is located within said second member and acts on the interior of said first member.

7. An articulated road vehicle according to claim 1, wherein the sensor unit is mounted for manual transfer between a locked in-use position and said deflected position.

8. A vehicle according to claim 1, wherein the sensor unit is mounted on the chassis of the tractor unit.

9. An articulated road vehicle according to claim 1, wherein the sensor unit is mounted on the sub-chassis of the fifth wheel of the trailer.

* * * * *

UNITED STATES PATENT AND TRADEMARK OFFICE
CERTIFICATE OF CORRECTION

PATENT NO.    : 5,856,887
DATED         : January 5, 1999
INVENTOR(S)   : Christopher Allan Standen It is certified that error appears in the above-identified patent and that said Letters Patent are hereby corrected as shown below:

Column 2, Line 25, change "A-A" to --III--

Signed and Sealed this

Thirtieth Day of May, 2000

Q. TODD DICKINSON

Attest:

*Attesting Officer*

*Director of Patents and Trademarks*